United States Patent [19]

McFarlane

[11] Patent Number: 5,008,890
[45] Date of Patent: Apr. 16, 1991

[54] RED, GREEN, BLUE UPCONVERSION LASER PUMPED BY SINGLE WAVELENGTH INFRARED LASER SOURCE

[75] Inventor: Ross A. McFarlane, Thousand Oaks, Calif.

[73] Assignee: Hughes Aircraft Company, Los Angeles, Calif.

[21] Appl. No.: 517,085

[22] Filed: May 1, 1990

[51] Int. Cl.⁵ .............................................. H01S 3/16
[52] U.S. Cl. ...................................... 372/41; 372/70; 372/71
[58] Field of Search ..................... 372/69, 75, 20, 23, 372/70, 39, 41, 92, 99

[56] References Cited

U.S. PATENT DOCUMENTS 4,782,494  11/1988  Pollack et al. ...................... 372/39
4,949,348  8/1990   Nguyen et al. ..................... 372/41

OTHER PUBLICATIONS

S. A. Pollack and D. B. Chang, "Ion-Pair Upconversion Laser Emission of $Er^{3+}$ Ions in YAG, $YLiF_4$, $SrF_2$ and $CaF_2$ Crystals", J. Appl. Phys. 64 2885 (1988).
A. J. Silversmith, W. Lenth, and R. M. Macfarlane, "An Infrared Pumped Erbium Upconversion Laser", Appl. Phys. Lett. 51 1977 (1987).
R. A. McFarlane, "Dual Wavelength Visible Upconversion Laser", Appl. Phys. Lett. 54 2301 (1989).
R. M. Macfarlane, F. Tong, A. J. Silversmith and W. Lenth.: "Violet CW Neodymium Upconversion Laser", Appl. Phys. Lett. 52 1300 (1989).
D. C. Nguyen, G. E. Faulkner and M. Dullick, "Blue—Green (450 nm) Upconversion $Tm^{3+}$; YLF Laser", Appl. Optics 28 3553 (1989).
F. Tong, R. M. Macfarlane and W. Lenth, "Laser Emission at 413 and 730 nm in Upconversion-Pumped $RLiF_4:Nd^{3+}$", Technical Digest of Conference on Quantum Electronics and Laser Science (Optical Society of America, Washington, D.C. 1989), paper THKK4.

Primary Examiner—James W. Davie
Attorney, Agent, or Firm—V. D. Duraiswamy; W. K. Denson-Low

[57] ABSTRACT

A full color upconversion laser pumped by a single wavelength infrared laser source is disclosed. The pump energy excites a rare earth doped crystal and can simultaneously lead to laser emission at several wavelengths. The laser includes a crystal of $YLiF_4:Er$ 5% fabricated in a monolithic structure which incorporates the laser mirrors as dielectric coatings on spherical surfaces of the crysal rod; the mirrors are optically reflecting at one or more of the desired output wavelengths. The laser rod is mounted in a helium cryostat that permits the operating temperature to be varied between 15° and 120° K. The pump energy is supplied through one of the mirrors specifically designed to be simultaneously highly reflecting at the laser wavelength and highly transmitting at the pump wavelength. To achieve optimum efficiency a lens is used in the pump path to focus the pump beam in such a manner as to provide a match of the laser mode size and pumped region of the crystal.

43 Claims, 2 Drawing Sheets

RED, GREEN, BLUE UPCONVERSION LASER PUMPED BY SINGLE WAVELENGTH INFRARED LASER SOURCE

This invention was made with Government support under Contract No. F49620-85-C-0058 awarded by the Department of the Air Force. The Government has certain rights in this invention.

BACKGROUND OF THE INVENTION

The present invention relates to lasers, and more particularly to an upconversion laser which can provide red, green and blue light from a single wavelength pump infrared laser.

In a conventional solid state laser, optical pumping is used to achieve a population inversion. Absorption of pump photons populates an excited state of the active ion which in general lies above the initial laser level.

Upconversion mechanisms that convert infrared radiation to visible radiation have been known for many years in the field of phosphors. Recent reports of laser pumped laser operation have also appeared based on these processes. See, e.g. "Ion-pair upconversion laser emission of $Er^{3+}$ ions in YAG, YLF$_4$, SrF$_2$ and CaF$_2$ crystals," S. A. Pollack and D. B. Chang, J. Appl. Phys., Vol. 64, page 2885 (1988); and "An infrared pumped erbium upconversion laser," A. J. Silversmith, W. Lenth, and R. M. MacFarlane, Appl. Phys. Lett., Vol. 51, page 1977 (1987). Using infrared pumping, laser emission has been obtained in the green, red and infrared. Laser operation at shorter wavelengths has required either a single yellow pump or a combination of IR and either yellow or red for all lasers operating at a wavelength shorter than 550 nm.

Energy addition using two pump wavelength excitation has been reported for UV/violet/blue laser output. $LaF_3:Nd^{3+}$ pumped simultaneously at 591 nm and 788 nm has produced 380 nm laser output. "Violet CW neodymium upconversion laser," R. M. Macfarlane, F. Tong, A. J. Silversmith and W. Lenth, Appl.Phys. Lett., Vol. 52, page 1300 (1988). $YLiF_4:Tm^{3+}$ pumped at 649 nm and 781 nm has produced a pulsed output at 450 nm. "Blue-green (450 nm) upconversion $Tm^{3+}$:YLF laser," D. C. Nguyen, G. E. Faulkner and M. Dullick, Appl. Optics, Vol. 28, page 3553 (1989). The yellow wavelengths are not available from semiconductor diode sources, though the 780 pump wavelengths are.

Single pump experiments have produced 551 nm laser action in $YLiF_4:Er^{3+}$ for 820 nm excitation. "An Infrared pumped erbium upconversion laser," id. Laser operation at 413, 730 and 1053 nm has been reported for $YLiF_4:Nd^{3+}$ pumped at 604 nm. "Laser emission at 413 and 730 nm in upconversion-pumped $YLiF_4:Nd^{3+}$," F. Tong, R. M. Macfarlane and W. Lenth, Technical Digest of Conference on Quantum Electronics and Laser Science (Optical Society of America, Washington DC 1989), Paper THKK4. For CW excitation in the vicinity of 800 nm, obtainable from semiconductor diodes, only one visible output wavelength, 551 nm, is known to have been reported by other workers.

The kinetics involved in the upconversion process involving rare earth ions are very complex and remain to be completely characterized.

Red-green-blue multicolored displays using efficient small size sources are needed for simulation purposes in training systems and for automotive and/or aircraft displays of all kinds. The improved efficiency of semiconductor laser pumped systems and the small size that they can achieve would greatly expand the number of application areas.

SUMMARY OF THE INVENTION

In accordance with the invention, laser operation in the visible (blue, green and red) is obtained by absorption of less energetic infrared pump photons and the use of upconversion processes that permit the excitation of ionic energy levels which lie above that being directly accessed by the pump photons. A pump source at a single wavelength obtainable from semiconductor diode lasers, exciting a rare earth doped crystal, can simultaneously lead to laser emission at several wavelengths.

In a preferred embodiment, the laser crystal rod is fabricated from $YLiF_4:Er^{3+}$ 5% disposed in a cooling system which permits cooling of the rod to 15 to 120 degrees Kelvin during laser operation. A first upconversion laser mirror is disposed adjacent a first end of the laser rod through which the pump energy passes into the laser rod. The first mirror is characterized by high transmissivity at the pump energy wavelength and high reflectivity at the upconversion wavelengths. A second upconversion laser mirror is mounted adjacent a second end of the laser rod and is characterized by a transmissivity in the range of 1% to 10% at the upconversion wavelengths. The laser rod is excited by a pump beam at about 800 nm for this example to generate visible light.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

In accordance with the invention, a red green blue upconversion laser pumped by a single wavelength infrared laser source is provided. The laser operates by optically exciting with the laser pump source specific energy levels of the rare earth ion in the host material.

Figure 1:
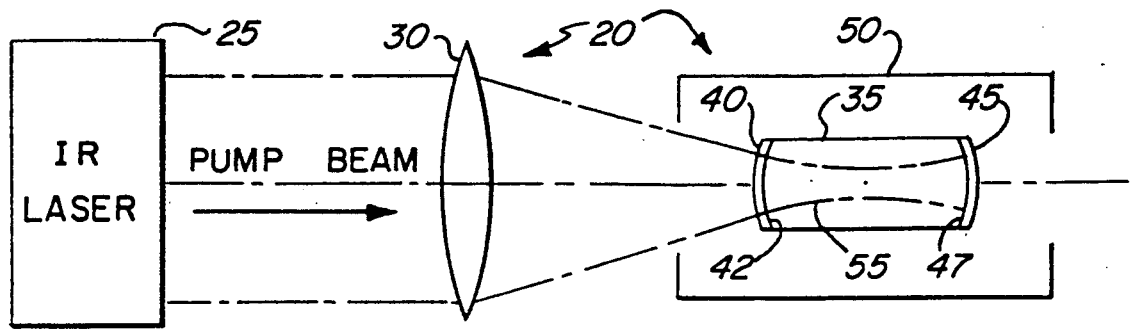
FIG. 1 is a simplified schematic block diagram of an upconversion laser embodying the present invention.

Referring now to FIG. 1, a simplified schematic block diagram of an upconversion laser 20 embodying the invention is illustrated. The laser 20 comprises a laser crystal rod 35 of $YLiF_4:Er5\%$ fabricated in a monolithic structure which incorporates the laser mirrors 40 and 45 as dielectric coatings on spherical surfaces 42 and 47 of the rod 35 which are optically reflecting at one or more of the desired output wavelengths. The laser rod 35 in this exemplary embodiment has a length of 5 millimeters, a diameter of 5 millimeters, and the convex spherical end surfaces 42 and 47 have radiuses of 3 centimeters.

The laser rod 35 is mounted in a helium cryostat 50 that permits the operating temperature to be varied between 15 and 120 degrees Kelvin (K). The pump energy is supplied by a semiconductor infrared laser 25, or a laser of a different kind such as a dye laser or Titanium Sapphire laser operating at about 800 nm through the laser mirror 40 which is specifically designed to be simultaneously highly reflecting at the laser wavelengths and highly transmitting at the pump wavelength. To achieve optimum efficiency, a lens 30 is used in the pump path to focus the pump beam in such a manner as to provide a match of the laser mode size and pumped region of the crystal 35. The internal laser mode is indicated by dashed lines 55 (FIG. 1).

The dielectric coating 40 is fabricated to have high reflectivity at the upconversion wavelengths (669 nm, 551 nm and 470 nm), and high transmissivity at the pump wavelength (780–820 nm). The dielectric coating 45 is fabricated to have a transmissivity in the range of 1% to 10% at the upconversion wavelengths to provide a means of outputting laser light from the laser 20. Such dielectric coatings are well known in the art; coatings of this type are commercially available, e.g., from Virgo Optics, Inc. Port Richey, Fla., and CVI Laser Corp., Albuquerque, N. Mex.

The laser pump source 25 for exciting the upconversion laser can most efficiently be used if arrangement is made to configure the path of the pump radiation inside the active cavity of the rod 35 in a manner that it overlaps the active mode being generated by the upconversion laser. This is conventionally known as "mode matching". To achieve this overlap, the Gaussian mode parameters of the upconversion laser oscillator (beam waist size and location, mirror spot sizes and phase front curvatures) are computed based on the wavelength, mirror curvatures, mirror spacing (the rod length for a monolithic structure as in the laser of FIG. 1) and refractive index of the material forming the crystal rod 35. This information is combined with the known Gaussian beam parameters of the pump source from which a design can be established of the transfer optics that deliver the pump beam to the input mirror surface of the upconversion laser. This optical system can be as simple as a single lens or a combination of two or more lenses that achieve a beam magnification if required. For example, a simple plano-convex lens of focal length 300 millimeters has been used for one particular application. It is occasionally useful to actually focus the pump beam somewhat more tightly than just described in order to control the transverse mode structure of the oscillation upconversion laser mode. This is a situation where so doing introduces a peaked distribution of optical pumping in a plane transverse to the propagation direction that enhances the on-axis gain in order to preferentially produce the $TEM_{00}$ mode. It is this transverse mode that is desirable for the majority of applications.

A semiconductor infrared laser operating at 797 nm is suitable for the purpose of the pump laser source 25. Such infrared lasers are commercially available; two examples are the Model SDL-3490-S and the Model SDL-5412-H1 semiconductor lasers marketed by Spectral Diode Laboratories, San Jose, Calif.

Figure 2:
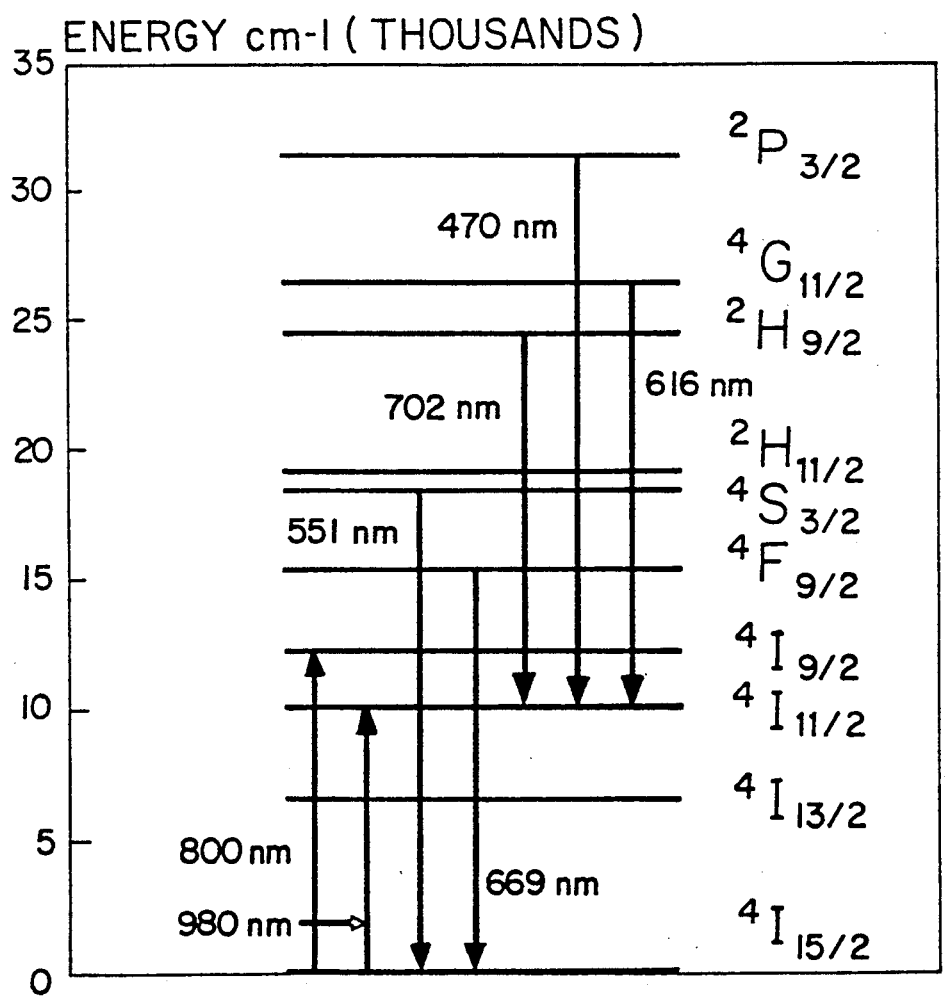
FIG. 2 is a graph showing the relevant levels of the Erbium ion in the $YLiF_4$ host material employed in the upconversion laser of FIG. 1.

FIG. 2 shows the relevant levels of the Erbium ion in the $YLiF_4$ host material. Emission at 470, 551, 618, 669 and 702 nm has been produced by exciting the $^4I_{9/2}$ level near 800 nm. The latter four of the laser wavelengths can also be obtained by excitation of the $^4I_{11/2}$ energy level at 980 nm. Such a pump source is provided by a Titanium Sapphire laser, Model Titan CW, marketed by Schwartz Electro-Optics, Orlando, Fla.; this laser is tunable over the range 700–1050 nm.

Table 1 shows a set of operating characteristics for the several systems with a pump excitation at 797 nm.

TABLE 1

| YLiF$_4$ ER5% - LASER TRANSITIONS 797 nm Excitation - 2.1 W Pump | | | |
|---|---|---|---|
| Transition | Wavelength (Angstroms) | Power Output | Temp °K. |
| $^2P_{3/2} - {}^4I_{11/2}$ | 4700.4 | 0.1 mW | 20K |
| $^4S_{3/2} - {}^4I_{15/2}$ | 5510.8, 5513.5 | 430 mW | 70K |
| $^4G_{11/2} - {}^4I_{11/2}$ | 6184.6 | 0.5 mW | 41K |
| $^4F_{9/2} - {}^4I_{15/2}$ | 6685. (3 Å Wide) | 26 mW | 41K |
| $^2H_{9/2} - {}^4I_{11/2}$ | 7015.4, 7023.4 | 50 mW | 41K |
| $^4I_{13/2} - {}^4I_{15/2}$ | 16160. | 167 mW | 100K |

It is possible, by varying the rod operating temperatures, to select the particular color output by the laser, as described, in "Dual wavelength visible upconversion laser," R. A. MacFarlane, Appl. Phys. Lett., Vol. 54, page 2301 (1989).

Instead of using a helium cryostat to cool the laser rod, other means may be employed, such as a closed cycle cooler that does not consume cryogenic fluid. One such exemplary device is the split-Stirling linear drive cooler available from Hughes Aircraft Company, Electron Dynamics Group, Torrance, Calif. as the model 7020 H linear drive cooler.

Wavelength selection is also possible by introducing a dispersive element such as a prism into the laser cavity and adjusting its orientation, in a manner well known to those skilled in the art. Other wavelength tuning elements include diffraction gratings and birefringent filters, also well known in the art. Use of such well known wavelength selection or tuning elements is generally preferred in a practical application to the use of temperature control to achieve wavelength selection.

Attention to material purity is important in the development of efficient laser crystals, because it is important to eliminate all unwanted loss mechanisms that are associated with energy transfer from the active ion to residual impurities. One preferred technique for obtaining high purity host materials is known as reactive atmosphere processing, useful for the preparation and purification of the desired starting materials, and at various times in the crystal growth stage. By providing for removal of dissolved or precipitated anion impurities, the physical properties of the crystals, including quantum efficiency, IR transparency and mechanical strength, can be vastly improved. Reactive atmosphere processing is described in several U.S. Pat. Nos. assigned to the assignee of this application, including 3,826,817; 3,932,597; 3,935,302; 3,969,491; 4,076,574; 4,128,589; 4,190,640; 4,190,487; and 4,315,832.

Fluorides are the presently preferred materials of choice for fabrication of the laser crystal rods in accordance with this invention. Fluorides have the advantage of high melting points (1000 to 1600 degrees Centigrade), stability in the ambient environment, and well-characterized spectra of rare-earth dopants. In one technique for preparing the crystal, the laser crystals are prepared from the highest purity oxides commercially available, usually characterized by a 10- to 100-ppm contaminant level. The host oxide is doped by diffusion of the required oxide of the ion at an elevated temperature, (700 degrees C.) to give a mixture of dopant and host that can be converted easily to a fluoride using the exchange reaction of $F^-$ for $O^{2-}$. Anhydrous HF can be used as the exchange initiator. Alternatively, it is possible to prepare the fluorides directly from the starting high purity oxides or carbonates by using HF as the source of $F^-$. Both methods yield ultra-high-purity fluoride powders that can be subsequently melted in a high temperature furnace using a reactive atmosphere, such as $CF_4$.

A Czochralski growth scenario may be employed where the grown crystal represents only a very small volume fraction of the melt to yield uniformly doped specimens. The Czochralski method, allows continuous viewing of the growing crystal, and affords the opportunity of aborting the run and restarting should polycrystallinity or control problems develop. Furthermore, with the Czochralski method, laser quality crystals requiring no annealing are quickly produced in a matter of hours rather than days.

For the Czochralski growth of the fluorides of interest, the reactive atmospheric processing (RAP) is based on anhydrous HF and CO, with helium as a carrier gas. The CO is a secondary RAP agent in that it efficiently eliminates a source of hydrogen impurity, $H_2O$ produced by outgassing, by chemical reaction to produce volatile $CO_2$ and $H_2$.

The fluoride crystals doped with rare-earth ions can be prepared as described above, starting with the host/dopant oxide mixture for subsequent conversion to fluorides. With the starting materials contained in a platinum crucible in a furnace, the furnace is evacuated to $10^{-3}$ Torr at room temperature, then backfilled with 2 atm of helium. For crystal growth, the following gas flow conditions can be established and maintained throughout the run: helium flow of 3 liters per minute (STP), HF flow of 0.2 liters per minute (STP), and CO flow of 0.5 liters per minute (STP). The temperature of the charge is raised to the melting temperature over a period of four hours. The crystal pulling rate will be about 4 mm/h using a pull rod rotation rate of 15 rpm, to obtain 5-cm-long crystals having a uniform diameter of 0.5 cm.

The $YLiF_4$ laser rods doped with erbium (5%) are also available commercially, e.g., from the Litton Airtron Division of Litton, Inc.

Figure 3:
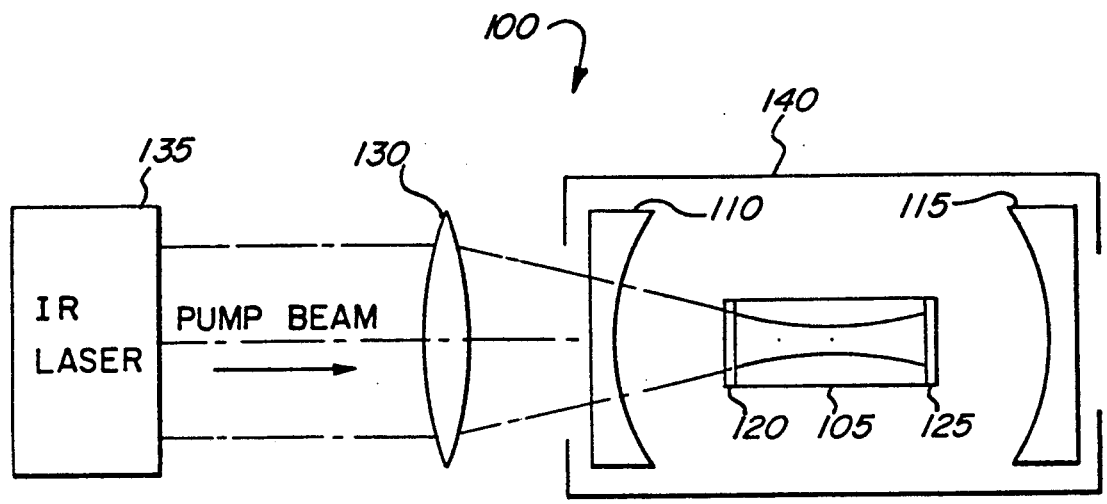
FIG. 3 is a simplified schematic block diagram of an alternative embodiment of an upconversion laser embodying the present invention.

An alternative embodiment of the upconversion laser is shown in FIG. 3. This laser 100 is similar to the laser 20 of FIG. 1 except that the laser mirrors 110 and 115 are external to the laser rod 105. The end surfaces of the laser rod are coated with antireflection AR coatings. AR coating 120 provides a low reflectivity (on the order of 0.1 percent) at both the pump wavelength and the upconversion laser wavelengths (red, blue, green). AR coating 125 has a low reflectivity at the upconversion wavelengths. As with the laser 20, the mirror 110 has high reflectivity at the upconversion wavelengths, and high transmissivity at the pump wavelength. The mirror 115 has a transmissivity in the range of 1% to 10% at the upconversion laser wavelengths.

For some laser transitions it could be useful to arrange a cascade laser combination in order to provide a mechanism for depopulating the lower laser level which, due to its long radiative lifetime, might represent a bottleneck to CW operation at the visible wavelength. For example, with respect to FIG. 2, it could be useful to provide laser mirrors on the ends of the rod that permit laser oscillation at 2.8 microns on the $^4I_{11/2}-^4I_{13/2}$ transition in order to depopulate the $^4I_{11/2}$ level during visible laser operation on transitions that terminate on that level.

One realization of a cascade system concerns the operation of the upconversion laser at two (or possibly more) wavelengths that are associated with a ladder relationship of the energy levels in the sequence of optical transitions giving rise to laser operation. This is exemplified in the sequence of the blue laser transition, $^2P_{3/2}-^4I_{11/2}$, followed by the IR laser transition $^4I_{11/2}-^4I_{13/2}$. The latter process represents a mechanism for depopulating the lower laser level of the first laser transition in a manner that could permit CW (non-self-terminating) operation that otherwise might be prohibited by a population bottleneck in $^4I_{11/2}$. This result can be achieved in a single pump arrangement by providing mirrors at the ends of the laser rod that simultaneously provide the appropriate reflectivity at each of the desired wavelengths where laser cascade operation is to occur. For example, to operate the laser at 470 nm, using a pump near 800 nm, the mirrors 40 and 45 can be provided with the following characteristics:

Mirror 40:
 High transmission at 800 nm.
 High reflectivity at 470 nm.
 High reflectivity at 2.8 microns.
Mirror 45: Transmission for output at 470 nm (1-10%).
 At 2.8 microns, can choose high reflectivity for zero output or 1-10% transmission for some output.

Again dual wavelength output can be accomplished by controlling the transmission of the output mirror.

Figure 4:
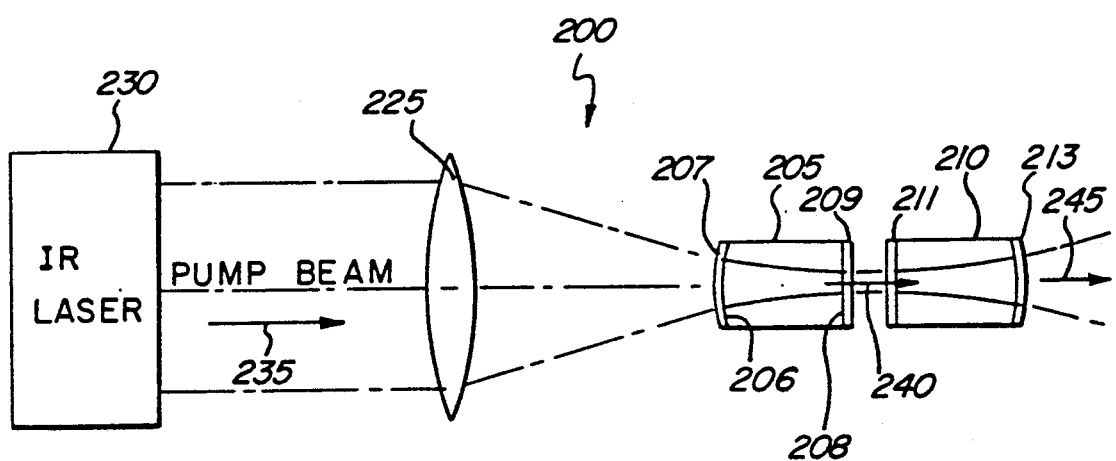
FIG. 4 is a simplified schematic block diagram of a second alternative embodiment of an upconversion laser embodying the present invention in a cascaded laser arrangement.

A quite different cascade can be identified that could significantly improve the operation of the upconversion laser pumped by a single IR pump wavelength by permitting higher temperature operation. Here the IR pump is used to drive laser emission from one crystal and both this one laser wavelength and the residual transmitted pump energy are combined to pump a second laser crystal that could be a different host/dopant combination. FIG. 4 illustrates such a cascaded upconversion laser arrangement. Here first and second laser rods 205 and 210 are arranged along the axis of the pump beam 235 from the pump laser 230. The pump beam 235 is focussed through lens 225. The first laser rod 205 may be, e.g., Nd:YAG, and the second laser rod 210 may be, e.g., Er:YLiF$_4$. One end 207 of rod 205 has a spherical end surface to which has been applied a mirror 207 which has high transmissivity at the pump wavelength and high reflectivity at the first laser wavelength. These wavelengths for an exemplary application are 800 nm and 1.06 microns. The other end 208 of the first laser rod 205 has a flat surface to which is applied a mirror 209, characterized by a transmissivity of 1% to 10% at the first laser wavelength, e.g., 1.06 microns for Nd:YAG.

The output light from the first laser 205, with residual pump light from the pump laser 230, enters the second laser rod 210 through the flat mirror 211, applied to a flat end surface of the rod 210. The other end of the laser rod 210 has a spherical surface to which is applied a second mirror 213. The first mirror 207 is characterized by high transmissivity at the pump and first laser wavelengths, and high reflectivity at the second laser wavelengths. The mirror 213 is characterized by a transmissivity of 1% to 10% at the second laser wavelengths.

As an example, an 800 nm pump beam from pump source 230 to give 1.06 micron emission from a monolithic YAG:Nd source laser comprising the first laser rod 205 could combine to pump the YLiF$_4$:Er rod 210 with direct excitation into the $^4I_{9/2}$ level of Erbium, as discussed above. The 1.06 micron laser radiation from the YAG:Nd laser rod 205 could be absorbed on the long lived metastable level $^4I_{13/2}$ to populate the $^4F_{9/2}$ level of Erbium, and thus result in a laser operating in the red, without the necessity of cooling to achieve the necessary relative radiative and phonon de-excitation rates needed for laser operation. The additional population achieved in level $^4F_{9/2}$ by this means can result in further upconversion pumping by pair processes out of this level to produce population in the $^2P_{3/2}$ level, which is the upper laser level for the blue 470 nm transition. In general, the introduction of energy by whatever means into these higher levels of the ion energy system can contribute to improved operation for all three, red, green and blue wavelengths. In this instance, it is expected that operation would be facilitated by the use of separate laser crystals or crystal pairs, one for each of the desired colors.

While the foregoing exemplary embodiments have employed erbium as the rare earth ion dopant, other rare earths may alternatively be used; examples include neodymium, ytterbium, terbium, thulium and holmium. These rare earths are characterized by the property that the energy levels are not very dependent on the host material. Host materials for the laser rod other than YLiF$_4$ may be employed. One particularly attractive alternate host material is BaY$_2$F$_8$. Other alternate host materials for the laser rod include oxide and halide glasses, and fluorozirconate and silica glass fibers.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A red green blue upconversion laser system pumped by a single pump laser source, comprising:
   a laser rod fabricated from a host material doped with a rare earth ion;
   a pump laser source for generating a pump beam substantially at a single infrared pump wavelength;
   a first upconversion laser mirror disposed adjacent a first end of the laser rod through which the pump beam passes into the laser rod, said first mirror characterized by high transmissivity at the pump beam wavelength and high reflectivity at the red, green and blue upconversion wavelengths; and
   a second upconversion laser mirror mounted adjacent a second end of the laser rod and characterized by a transmissivity in the range of 1% to 10% at the red, green and blue upconversion wavelengths.

2. The upconversion laser system of claim 1 further comprising a wavelength tuning means to obtain upconversion laser operation at a desired color.

3. The upconversion laser system of claim 2 wherein said tuning means comprises a means for controlling the temperature of the laser rod to obtain upconversion laser operation at a desired color.

4. The upconversion laser system of claim 3 wherein said temperature controlling means comprises a means for cooling the laser rod to a temperature to obtain upconversion laser operation at a desired color.

5. The upconversion laser system of claim 2 wherein said rare earth ion comprises Erbium (Er).

6. The upconversion laser system of claim 5 wherein said pump wavelength is in the range of 780 to 820 nm.

7. The upconversion laser system of claim 6 wherein said pump wavelength is at about 797 nm, and said laser system is operated to provide a blue laser output at about 470 nm from the $^2P_{3/2}$–$^4I_{11/2}$ transition.

8. The upconversion laser system of claim 6 further comprising a temperature controlling means to control the temperature of the laser rod to about 15° Kelvin.

9. The upconversion laser system of claim 6 wherein said pump wavelength is about 797 nm, and said laser system is operated to provide a laser output at about 551 nm from the $^4S_{3/2}$–$^4I_{15/2}$ transition.

10. The upconversion laser system of claim 9 further comprising a temperature controlling means to control the temperature of the laser rod to about 70° Kelvin.

11. The upconversion laser system of claim 6 wherein said pump wavelength is at about 797 nm, and said laser system is operated to provide a laser output of about 618 nm from the $^4G_{11/2}$–$^4I_{11/2}$ transition.

12. The upconversion laser system of claim 11 further comprising a temperature controlling means to control the temperature of the laser rod to about 41° Kelvin.

13. The upconversion laser system of claim 6 wherein said pump wavelength in the range of 780 to 820 nm, and said laser system is operated to provide a laser output of about 668 nm from the $^4F_{9/2}$–$^4I_{15/2}$ transition.

14. The upconversion laser system of claim 13 further comprising a temperature controlling means to control the temperature of said laser rod to about 41° Kelvin.

15. The upconversion laser system of claim 6 wherein said pump wavelength is at about 797 nm, and said laser system is operated to provide a laser output of about 701 nm from the $^2H_{9/2}$–$^4I_{11/2}$ transition.

16. The upconversion laser system of claim 15 further comprising a temperature controlling means to control the temperature of said laser rod to about 41° Kelvin.

17. The upconversion laser system of claim 1 wherein said laser rod is fabricated from YLiF$_4$:Er$^{3+}$5%.

18. The upconversion laser system of claim 1 wherein said host material comprises YLiF$_4$.

19. The upconversion laser system of claim 1 wherein said host material comprises BaY$_2$F$_8$.

20. The upconversion laser system of claim 1 wherein said rare earth is selected from the group comprising neodymium, erbium, ytterbium, terbium, thulium and holmium.

21. The upconversion laser system of claim 1 wherein said pump laser source comprises a semiconductor infrared laser.

22. The upconversion laser system of claim 1 wherein said first and second mirrors comprise dielectric coatings applied to spherical end surfaces of the laser rod, thereby forming a monolithic laser rod-mirror structure.

23. A red green blue upconversion laser pumped by a single pump laser source, comprising:
   a crystal laser rod fabricated from a material selected from the group comprising YLiF$_4$:Er and BaY$_2$R$_8$:Er;
   a pump laser source for generating pump energy substantially at a single pump wavelength at about 800 nm;

a first upconversion laser mirror disposed adjacent a first end of the laser rod through which the pump energy passes into the laser rod, said first mirror characterized by high transmissivity at the pump energy wavelength and high reflectivity at the upconversion wavelengths;

a second upconversion laser mirror mounted adjacent a second end of the laser rod and characterized by a transmissivity in the range of 1% to 10% at the red, green and blue upconversion wavelengths; and wavelength tuning means to obtain upconversion laser operation at a desired color.

24. The laser of claim 23 wherein said first and second mirrors comprise dielectric coatings applied to spherical end surfaces of the laser rod, thereby forming a monolithic laser rod-mirror structure.

25. The laser of claim 24 wherein said pump laser source comprises a semiconductor infrared laser.

26. The laser of claim 23 further comprising a temperature controlling means for controlling the temperature of the laser rod to obtain upconversion laser operation at a desired color.

27. The laser of claim 26 wherein said temperature controlling means comprises a means for cooling the laser rod to a temperature to obtain upconversion laser operation at a desired color.

28. A blue upconversion laser system pumped by a single pump laser source, comprising:

a laser rod fabricated from a host material doped with a rare earth ion;

a pump laser source for generating a pump beam substantially at a single infrared pump wavelength;

a first upconversion laser mirror disposed adjacent a first end of the laser rod through which the pump beam passes into the laser rod, said first mirror characterized by high transmissivity at the pump beam wavelength and high reflectivity at the blue upconversion wavelength;

a second upconversion laser mirror mounted adjacent a second end of the laser rod and characterized by a transmissivity in the range of 1% to 10% at the blue upconversion wavelength; and means for controlling the temperature of the laser rod to achieve upconversion operation at the blue upconversion wavelength.

29. The upconversion laser system of claim 28 wherein said temperature controlling means comprises a means for cooling the laser rod to about 15° Kelvin.

30. The upconversion laser system of claim 28 wherein said first and second mirrors comprise dielectric coatings applied to spherical end surfaces of the laser rod, thereby forming a monolithic laser rod-mirror structure.

31. The upconversion laser system of claim 28 wherein rare earth ion comprises Erbium (Er).

32. The upconversion laser system of claim 28 wherein said pump wavelength is in the range of 780 to 820 nm.

33. The upconversion laser system of claim 32 wherein said pump wavelength is at about 797 nm, and said laser system is operated to provide a blue laser output at about 470 nm from the $^2P_{3/2}-^4I_{11/2}$ transition.

34. The upconversion laser system of claim 28 wherein said host material is selected from the group comprising $YLiF_4$ and $BaY_2F_8$.

35. The upconversion laser system of claim 28 wherein said rare earth is selected from the group comprising neodymium, erbium, ytterbium, terbium, thulium and holmium.

36. The upconversion laser system of claim 28 wherein said pump laser source comprises a semiconductor infrared laser.

37. An upconversion laser pumped by a single pump laser source and employing a cascade laser combination, comprising:

a laser rod fabricated from a host material doped with a rare earth ion;

a pump laser source for generating a pump beam substantially at a single infrared pump wavelength;

a first upconversion laser mirror disposed adjacent a first end of the laser rod through which the pump beam passes into the laser rod, said first mirror characterized by high transmissivity at the pump beam wavelength and high reflectivity at first and second upconversion wavelengths;

a second upconversion laser mirror mounted adjacent a second end of the laser rod and characterized by a transmissivity in the range of 1% to 10% at one or more of the upconversion wavelengths; and means for controlling the temperature of the laser rod to achieve upconversion operation; and wherein the first and second wavelengths are associated with a ladder relationship of the energy levels of the dopant ion in the sequence of optical transitions giving rise to laser operation.

38. The upconversion laser of claim 37 wherein said rare earth is erbium, said first upconversion wavelength is at about 470 nm, resulting from the blue laser transition $^2P_{3/2}-^4I_{11/2}$, and said second upconversion wavelength is at about 2.8 microns resulting from the infrared laser transition $^4I_{11/2}-^4I_{13/2}$.

39. The upconversion laser of claim 37 wherein said laser rod is fabricated form a host material selected form the group comprising $YLiF_4$ and $BaY_2F_8$.

40. A cascaded upconversion laser system, comprising:

a pump laser source for generating a pump beam substantially at a single infrared pump wavelength;

a first laser comprising a first laser rod arranged along the axis of the beam from the pump laser;

a second laser comprising a second laser rod fabricated from a crystal host material doped with a rare earth ion and arranged along the axis of the pump beam, such that the pump beam passes into the first laser rod and the residual pump beam exiting the first laser incident on the second laser;

the first laser further characterized by a first laser mirror mounted adjacent a first end of the first rod through which the laser beam passes in the first rod, said first mirror characterized by high transmissivity at the pump beam wavelength and high reflectivity at a first laser wavelength, and a second laser mirror mounted adjacent the second end of the first laser rod and characterized by a transmissivity of 1% to 10% at the first laser wavelength;

the second laser further characterized by a third laser mirror mounted adjacent a first end of the second laser rod through which output light from the first laser passes into the second laser rod, the third laser mirror characterized by high transmissivity at the pump and said first laser frequency and high reflectivity at the second laser wavelength, and a fourth laser mirror mounted adjacent the second end of the second rod, characterized by a transmissivity in the range of 1% to 10% at the second laser wavelength.

41. The laser system of claim 40 wherein said first laser rod is fabricated from Nd:YAG, and said first laser wavelength is 1.06 microns.

42. The laser system of claim 41 wherein said second laser rod is fabricated from YLiF$_4$:Er.

43. The laser system of claim 42 wherein the 1.06 micron emission from the first laser combines with the pump beam to pump the second laser with direct excitation into the $^4I_{9/2}$ energy level of Erbium, the 1.06 micron radiation being absorbed on the long lived metastable level $^4I_{13/2}$ to populate the $^4F_{9/2}$ level of Erbium, and thus result in laser operation in red visible light output without the necessity of cooling.

* * * * *